United States Patent [19]

Nishikawa et al.

[11] 4,408,870
[45] * Oct. 11, 1983

[54] DUPLICATING SYSTEM COMPRISING ELECTROPHOTOGRAPHIC COPYING APPARATUS AND OPTION DEVICES

[75] Inventors: Masaji Nishikawa; Kiyoshi Miyashita; Muneo Kasuga, all of Hachioji, Japan

[73] Assignee: Olympus Optical Company Limited, Tokyo, Japan

[*] Notice: The portion of the term of this patent subsequent to Jan. 25, 2000 has been disclaimed.

[21] Appl. No.: 261,740

[22] Filed: May 7, 1981

[30] Foreign Application Priority Data

May 9, 1980 [JP] Japan .................................. 55-61300

[51] Int. Cl.³ ............................................. G03G 15/00
[52] U.S. Cl. .................................. 355/14 SH; 355/1;
355/3 SH; 355/11; 355/55; 355/66
[58] Field of Search ................. 355/14 R, 11, 3 R, 51,
355/65, 66, 3 SH, 14 SH, 8, 1, 55-57

[56] References Cited
U.S. PATENT DOCUMENTS

| 3,592,539 | 7/1971 | Haslam et al. ........................ 355/11 |
| 3,623,806 | 11/1971 | Short ................................. 355/64 X |
| 3,747,918 | 7/1973 | Margulis et al. ........................ 271/4 |
| 4,170,412 | 10/1979 | Grace et al. ...................... 355/11 X |

*Primary Examiner*—R. L. Moses
*Attorney, Agent, or Firm*—Fleit, Jacobson, Cohn & Price

[57] ABSTRACT

A duplicating system comprises an electrophotographic copying apparatus which includes a first optical scanning system for making a slit exposure, a first document feeder for feeding a first document to be copied at a first speed with respect to the first optical scanning system, a rotating photosensitive drum for forming an electrostatic latent image corresponding to the image of document, and means for forming a duplicated copy with the aid of the latent image; and an option device detachably mounted onto the copying apparatus and comprising a second optical scanning system for making a slit exposure, a second document feeder for feeding a second document to be copied at a second speed with respect to the second optical scanning system and an optional optical system for projecting the image of second document onto the photosensitive drum. The first document feeder in the copying apparatus and the second document feeder in the option device are so constructed that the first and second documents are fed in the same direction.

27 Claims, 20 Drawing Figures

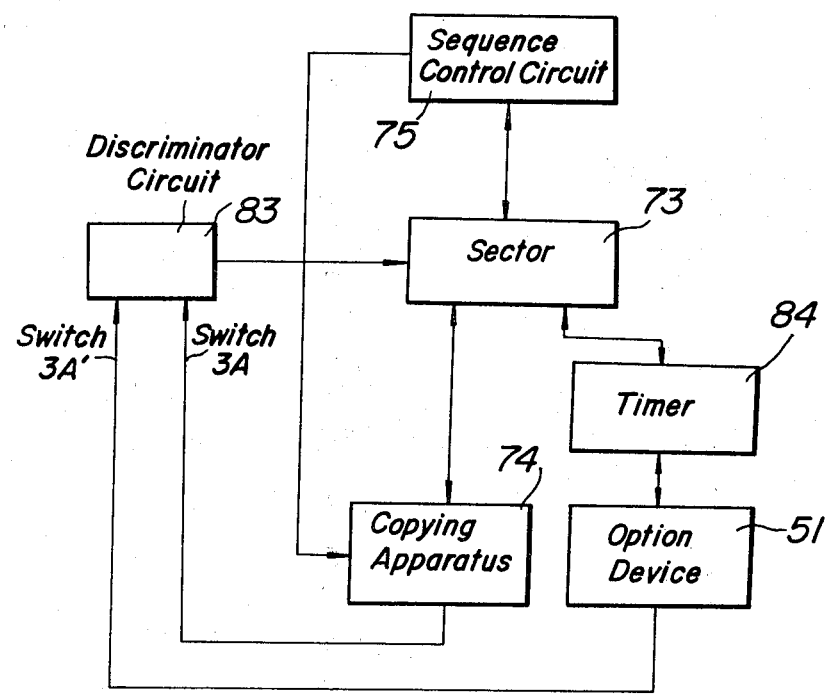
FIG_9

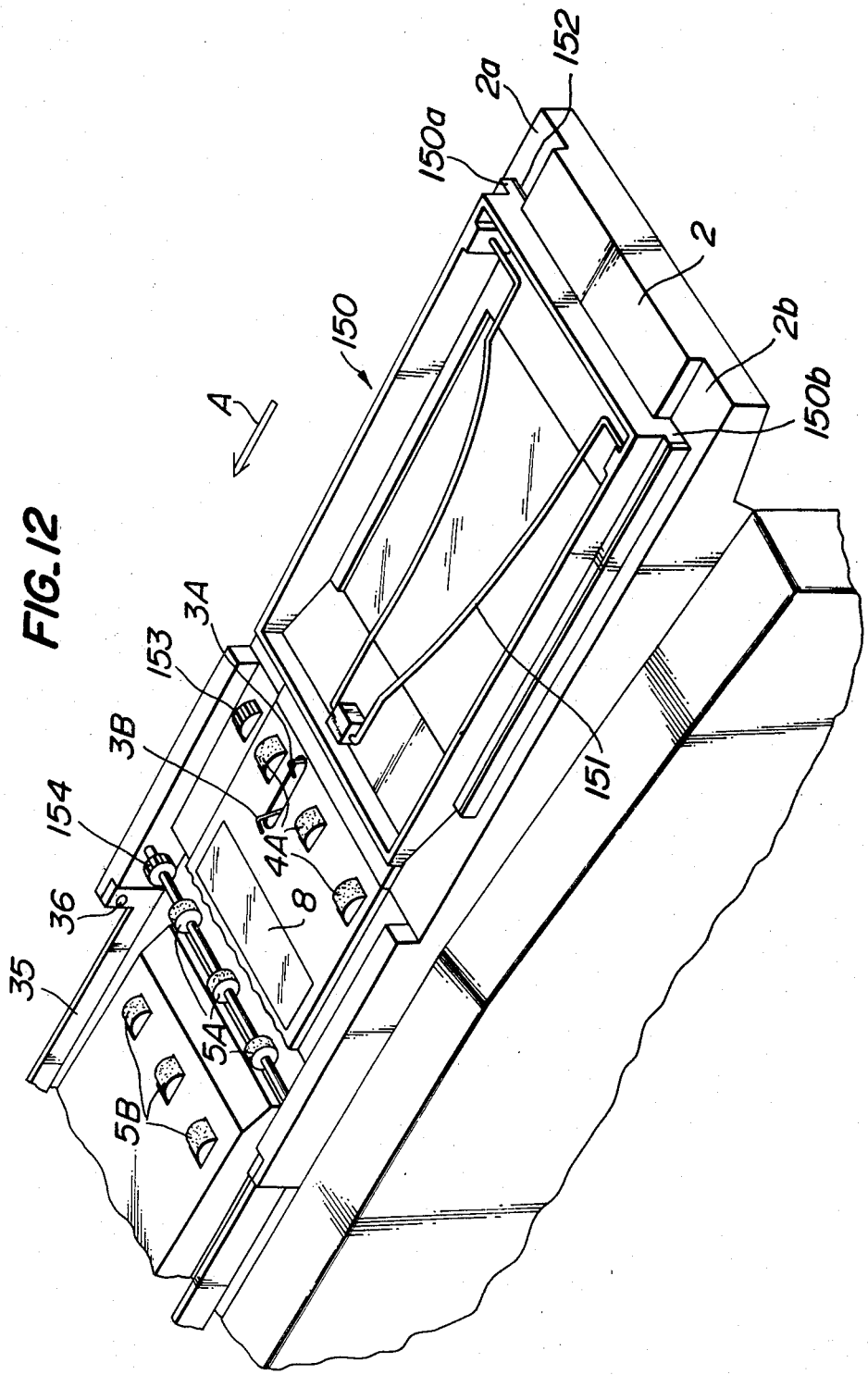

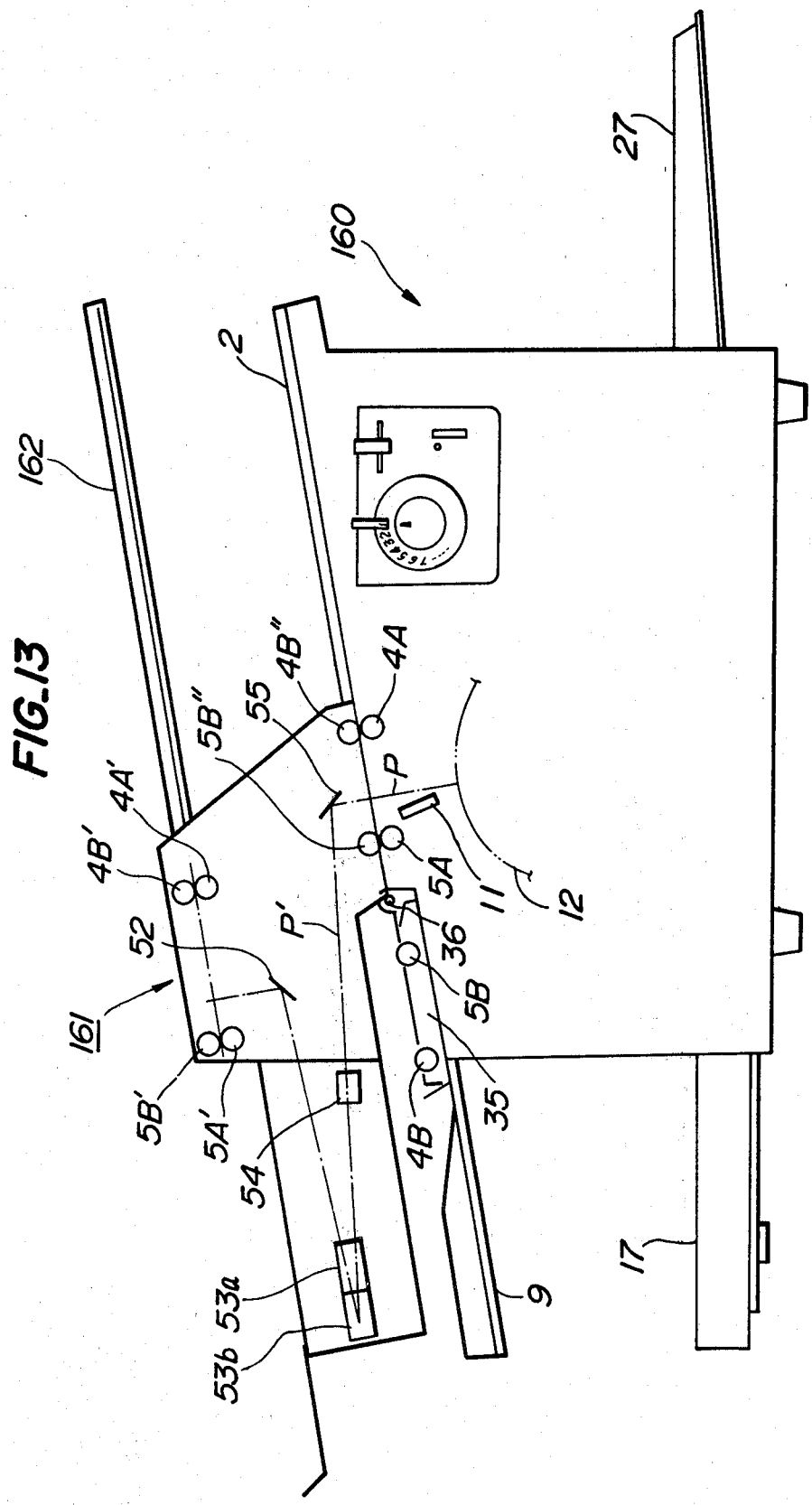

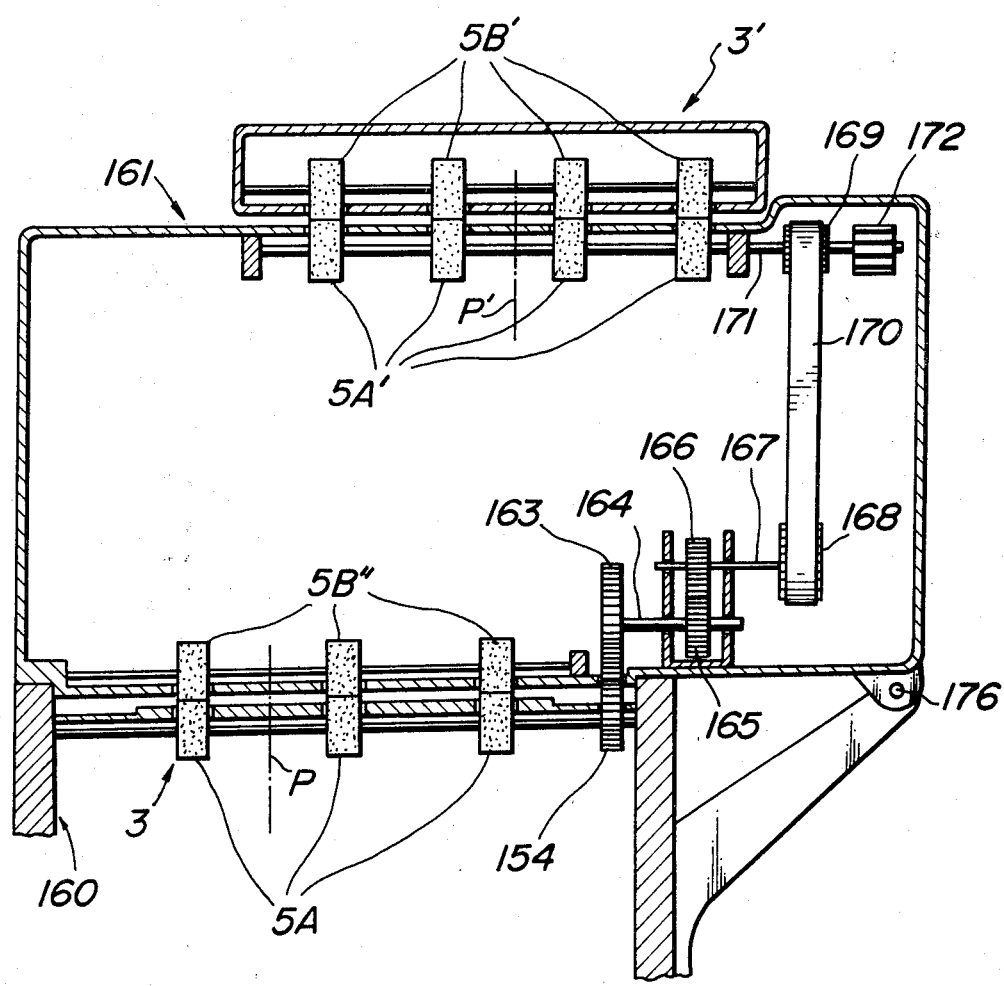
FIG_14

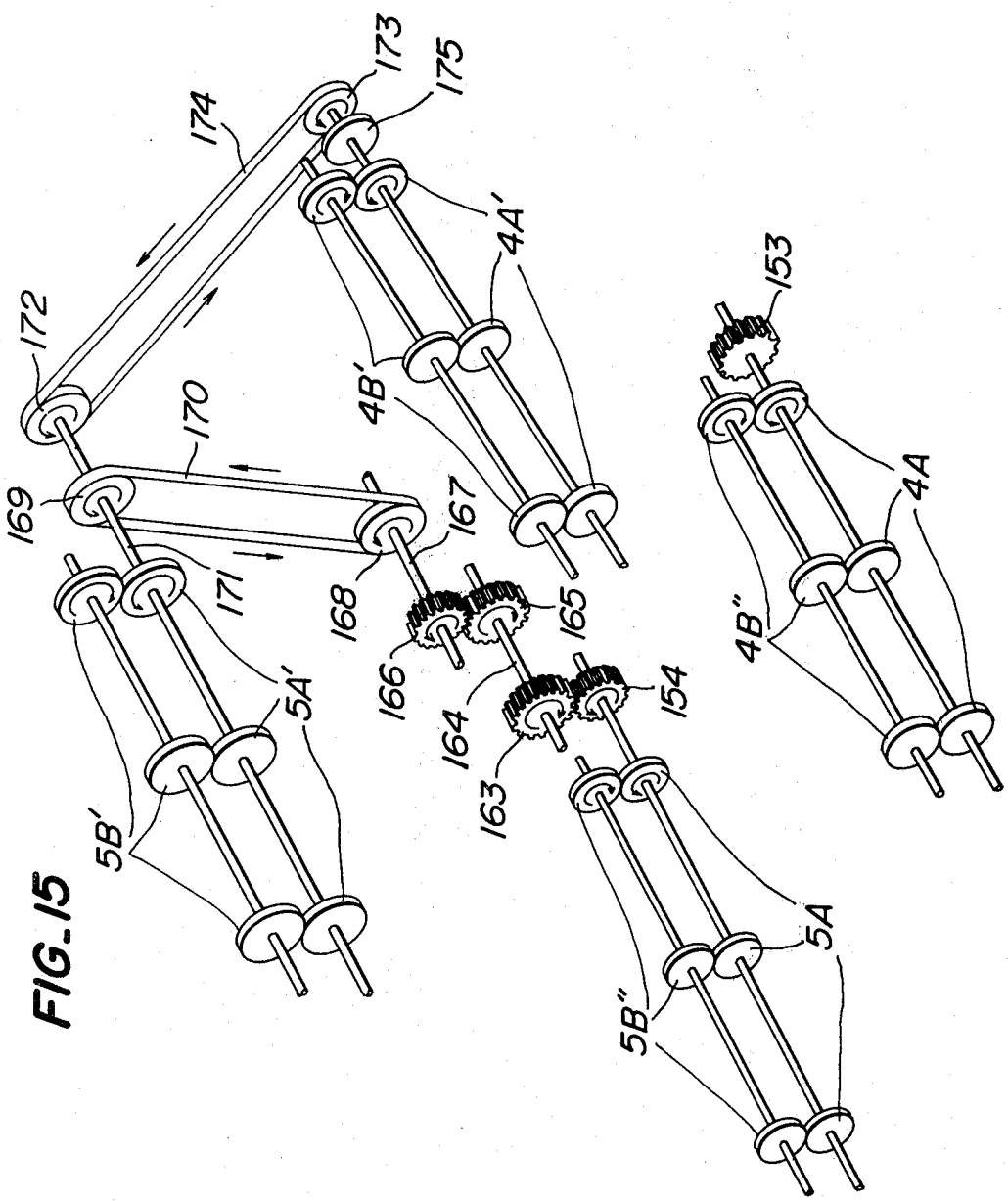

DUPLICATING SYSTEM COMPRISING ELECTROPHOTOGRAPHIC COPYING APPARATUS AND OPTION DEVICES

BACKGROUND OF THE INVENTION

The present invention relates to an electrophotographic system comprising an electrophotographic copying apparatus and an option device for forming an enlarged or reduced image of a document set in the option device.

The copying apparatus represented by an electrophotographic copying apparatus has practically been used in many ways for the purpose of copying documents, and almost all of the copying apparatuses are constructed to obtain a copy of the same size from sheet-like and book-like documents. On the other hand, there has been known such apparatus that a reduced image of a large size document is printed or an enlarged image of a microfilm is printed in an electrophotographic manner, but such apparatus is assembled in a copying apparatus with the inseparable form or in case of using it as an option device, use is made of the same optical path as that of the copying apparatus itself or use is made of a part of an optical path of the copying apparatus itself in common. It is common technique to assemble a reduction optical system in the copying apparatus itself inseparably, but the thus assembled apparatus becomes large and complicated. It is further known to detachably add an optical image projector to the copying apparatus itself as an option device, but such apparatus also has various defects. For example, in Japanese Patent Application Publication No. 4,944/67, Japanese Patent Application Publication No. 8,437/69, Japanese Patent Laid-open No. 62,724/76, Japanese Utility Model Laid-open No. 127,827/77, Japanese Patent Laid-open No. 55,647/77 and the like, there is disclosed that the whole frame of a microfilm image is projected on a document table or a photosensitive member as a still picture by an option device and the projected image is scanned and exposed in the former apparatus by a scanning optical system, while in the latter apparatus the projected image is directly converted into an electrostatic latent image. However, the copying apparatus for copying the whole frame of a microfilm image projected as a still picture is large as the apparatus itself and lack universality and convenience as compared with the copying apparatus of a document moving, scanning and exposing type which has recently been often used. In the former system for projecting the microfilm image on the document table, when an enlarged image is projected by an option device, it is necessary to provide a long optical path in the device, so that the option device becomes disadvantageously large.

Further in case of using an electrophotographic copying apparatus of a slit exposure and scanning type in which the document to be copied is moved at a given constant speed with respect to a scanning optical system, it is required to construct the option device also as the slit exposure and scanning type. In such a case if a feeding direction of document inserted in the option device is made different from the feeding direction of document inserted in the copying apparatus, a user might confuse in handling the document to be copied. For instance, if the document feed direction in the option device is reversed to that in the copying apparatus, a relation between postures, i.e. front and rear, and right and left of documents and duplicated copies becomes reversed for the duplication with and without the option device. Therefore, the operator has to remember the above relation and has to insert the documents with taking into account the relation. This is quite inconvenient for the operator. Therefore, it is quite desirable to construct the option device into which the document can be inserted in the same direction as that of the document feed in the copying apparatus.

In case of detachably mounting the option device on the copying apparatus, it is desired that the document inserted in the copying device can be duplicated without removing the option device in order to improve the useful function of the duplicating system. In the known systems, since the document table of the copying apparatus is almost covered or hindered by the option device, the operator could not see well the document table of copying apparatus and feels difficult in handling the document. Further in many copying apparatuses, operating members such as a copy start button, stop button, copy number selector, and various indicating lamps are usually arranged on a front panel or a top panel and thus, when the option device is mounted on the copying apparatus, these operating members and indicating lamps might be hindered by the option device. In order to avoid such a drawback, it is necessary to shift the option device with respect to the copying apparatus in a direction perpendicular to the document feed direction.

Moreover it should be noted that in order to reduce the size and cost of the option device, it is desirable not to provide in the option device a driving source for feeding the document inserted into the option device. This can be achieved by driving the document feeder of the option device by means of a driving source provided in the copying apparatus for feeding the document inserted into the copying apparatus. Moreover in such known electrophotographic duplicating systems comprising the electrophotographic apparatus and the option device for projecting the enlarged or reduced image of document, it is impossible to control the option device commonly by means of a sequence control circuit for controlling a duplicating operation of the copying apparatus without the option device, because the image of document is projected from the option device onto a photosensitive member of the copying apparatus from a position which is different from an imaginary control start position of the photosensitive member in case of normal duplicating operation without the option device. Therefore, it is necessary to provide a separate sequence control circuit. This causes the duplicating system complicated in construction and expensive in cost.

SUMMARY OF THE INVENTION

The present invention has for its object to provide a novel and useful duplicating system comprising an electrophotographic copying apparatus of slit exposure and scanning type and an option device detachably mounted on the copying apparatus for projecting an image of document inserted into the option device, which system can eliminate the above described disadvantages of the known duplicating system.

It is another object of the invention to provide a duplicating system in which a document feed direction in the option device can be made identical with a document feed direction in the copying apparatus.

It is still another object of the invention to provide a duplicating system in which the option device can be shifted with respect to the copying apparatus in a direction perpendicular to a document feed direction.

It is still another object of the invention to provide a duplicating system in which a document feeder of the option device can be driven by means of a driving source provided in the copying apparatus.

According to the invention a duplicating system comprises an electrophotographic copying apparatus which includes first optical scanning means for making a slit exposure, first means for feeding a first document to be copied at a first speed with respect to said first optical scanning means, photosensitive means for forming an electrostatic latent image corresponding to the image of document, and means for forming a duplicated copy with the aid of said latent image; and an option device which includes means for detachably mounting the option device onto the copying apparatus, second optical scanning means for making a slit exposure, second means for feeding a second document to be copied at a second speed with respect to said second optical scanning means and optional optical means for projecting the image of second document onto said photosensitive means for the copying apparatus; wherein said first feeding means in the copying apparatus and second feeding means in the option device are so constructed that the first and second documents are fed in the same direction.

Further a duplicating system according to the invention comprises an electrophotographic copying apparatus which includes first optical scanning means for making a slit exposure, first means for feeding a first document to be copied at a first speed with respect to said first optical scanning means, photosensitive means for forming an electrostatic latent image corresponding to the image of document, and means for forming a duplicated copy with the aid of said latent image; and an option device which includes means for detachably mounting the option device onto the copying apparatus, second optical scanning means for making a slit exposure, second means for feeding a second document to be copied at a second speed with respect to said second optical scanning means and optional optical means for projecting the image of second document onto said photosensitive means of the copying apparatus; wherein said first document feeding means provided in the copying apparatus comprises a lower feeding mechanism having feeding rollers and a driving source for rotating the feeding rollers, and an upper feeding mechanism having rollers which are rotated with being in contact with said feeding rollers of the lower feeding mechanism, the upper feeding mechanism being removably mounted on the lower feeding mechanism, and when the option device is mounted on the copying apparatus after the upper feeding mechanism has been removed from the lower feeding mechanism, said second feeding means is driven by means of said driving source provided in the lower feeding mechanism.

BRIEF EXPLANATION OF THE DRAWINGS

FIG. 9 is a block diagram depicting another embodiment of the control circuit;

FIG. 12 is a perspective view showing another embodiment of the copying apparatus according to the invention;

FIG. 13 is a front view illustrating a whole duplicating system according to the invention;

FIG. 14 is a cross section showing a document feeder of the option device; and

FIG. 15 is a perspective view illustrating the document feeder of the option device.

DESCRIPTION OF THE PREFERRED EMBODIMENT

Figure 1:
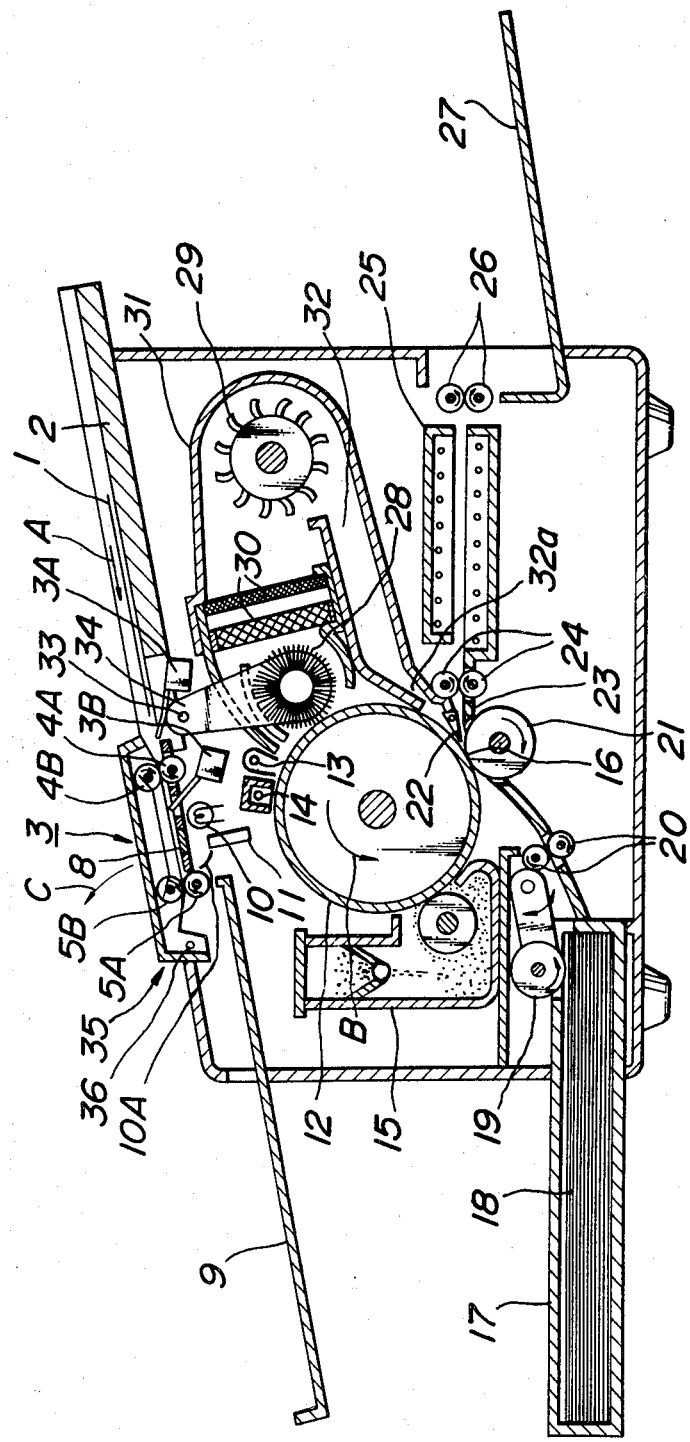
FIG. 1 is a cross section showing schematically an embodiment of a known electrophotographic copying apparatus of slit scanning type to which the present invention can be advantageously applied.

Referring now to the drawings, wherein same reference numerals designate same or corresponding parts throughout the several views. FIG. 1 shows one embodiment of a conventional electrophotographic copying apparatus, to which the present invention is preferably applied. The copying apparatus in this embodiment is a type for carrying out scanning and exposure by fixing a scanning optical system and moving a document. In this copying apparatus, a sheet-like document 1 is placed on an inclined document table 2, inserted into a document feeder 3 from the direction of an arrow A; moved by document feed rollers 4A, 4B and 5A, 5B provided in the document feeder 3, and is finally discharged on a document tray 9. The document feed rollers 4A and 5A are selectively driven in response to signals generated by switches 3A and 3B which are arranged in a document feed path to detect the document 1. The upstream feed roller 4A is connected through a clutch (not shown) to a driving motor (not shown). The downstream feed roller 5A is directly connected to the driving motor and thus, is rotated as long as the motor rotates during a duplicating period. The clutch is driven in response to a signal which is produced when the switch 3A is actuated by the front edge of the manually inserted document 1. Then the roller 4A is rotated to feed the document 1 at a given speed V. As soon as the front edge of document 1 is detected by the switch 3B, the clutch is deenergized so as to stop the document feed for a relatively short time. After the the clutch is actuated again at a suitable timing to restart the feeding of the document 1. When the rear edge of document 1 has passed through the switch 3B, the switch is made off and the clutch is deenergized so as to stop the rotation of the feed roller 4A. The rollers 4B and 5B rotate together with the rollers 4A and 5A, respectively. During the feeding of document 1 through the feeder 3, the document 1 is illuminated by an illumination lamp 10 such as fluorescent lamp and a reflector 10A, and a document image is projected on a rotating photosensitive drum 12 by an optical system 11 for making a slit exposure consisting of an array of converging optical fibers through a transparent glass plate 8. The photosensitive drum 12 comprises a conductive substrate and a photoconductive layer consisting of, for example, Se on the surface thereof, rotated in the direction of an arrow B, erased by an erasing lamp 13, thereafter uniformly charged by a corona charger 14, and forms an electrostatic latent image on the photoconductive layer by receiving the optical image of document. This electrostatic image is developed with toners by a dry developing device 15 using a developing agent of two composition type and is carried to a toner image transfer section 16 according to rotation of the photosensitive drum 12. On the other hand, record papers 18 provided in a cassette 17 are taken out one by one by swinging and rotating pickup roller 19 and sent to the toner image transfer section 16 by registering rollers 20 at a predetermined timing. In the toner image transfer section 16, the record paper is conveyed between a bias transfer roller 21 applied by a bias voltage and the photosensitive drum 12 so as to superimpose it on the toner image thereby to transfer a toner image on the paper. In this case, the record paper 18 is closely carried to the toner image, i.e., the photosensitive drum 12, so that the paper is peeled off by a peeling claw 22 and an air flow which will be explained later on, conveyed along a guide plate 23, and fed into a fixing device 25 having a heater by means of carrying rollers 24, and then the toner image is fixed thereon, and finally the paper is discharged on a copy tray 27 by discharging rollers 26. The toner image formed on the photosensitive drum 12 is not completely transferred to the record paper, but a part thereof is remained on the drum 12, so that this remained toner particles are brushed off by a rotating cleaner brush 28, the thus brushed-off toner particles are sucked by an air flow generated by rotation of a fan 29 and collected by filters 30. The cleaner brush 28, the filters 30, and the fan 30 are covered with a housing 31 for obtaining an effective toner sucking force and for preventing the toner from being dispersed in the apparatus. Exhausted air of the fan 29 is guided to a duct 32, an exhaust port 32a of the duct 32 is faced to the toner image transfer section 16 so as to act together with the claw 22 thereby effectively peeling the record paper from the photosensitive drum 12. The cleaner brush 28 is rotatably pivoted on an arm 34 rotatably mounted around a supporting shaft 33. When an electrostatic latent image once formed on the photosensitive drum 12 is repeatedly used, the toner developing and transferring steps are repeated, and in case of multiple copying in which the toner images are successively transferred onto a plurality of record papers, the cleaner brush 28 is separated from the photosensitive drum 12. In addition, an upper carrying mechanism 35 of the document feeder 3 is so constructed that it can be opened and closed around a shaft 36 in the direction shown by an arrow C, and in case of copying thick documents such as a book or the like, the carrying mechanism 35 is rotated in the direction of the arrow C and placed on the document tray 9 so as to form a thick document carrying path. The operation of the aforementioned each part which constructs the copying apparatus is controlled by detecting document position by the switches 3A, 3B arranged in the document carrying path. The copying apparatus illustrated in FIG. 1 is constructed very small so as to duplicate ordinary sheet-like documents and book documents with a unit magnification.

The construction of adding a microfilm enlarged image projection device, a document reduced image projection device or the like as an option device to the copying apparatus of such document moving type with the scanning and exposing system has such advantages that a usable function is enlarged and a person who does want such function feels the less burden. Thus, the copying apparatus is very high in usable value. However, it has not been known that the device having such construction can easily be composed, while if the apparatus becomes complicated in construction, the usable value is lost. As apparent from the prior art, in the system of projecting an optical image formed by an option device through an optical path of the copying apparatus itself, in order to converge a luminous flux of the projected image to a projection lens of the apparatus itself, the optical system should be improved by providing a Fresnel lens or the like. Moreover, the type which uses the same optical path as that of the copying apparatus itself but keeps out a projection lens of the apparatus itself has been known as one shot exposure system, but the one shot exposure system makes the copying apparatus large and does not adapt to the miniature and handy copying apparatus aimed by the present invention. The present invention, therefore, provides a copying apparatus of a document scanning type which can receive an optical image from an option device by means of a simple construction.

Figure 2A:
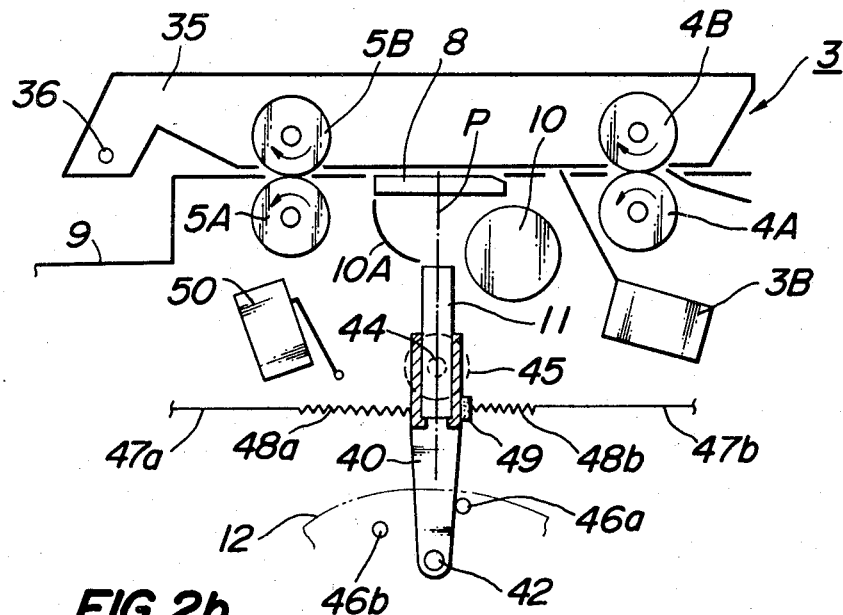
FIGS. 2a and 2b are schematic views illustrating a mechanism for withdrawing an optical system of the copying apparatus in the present invention.
Figure 3:
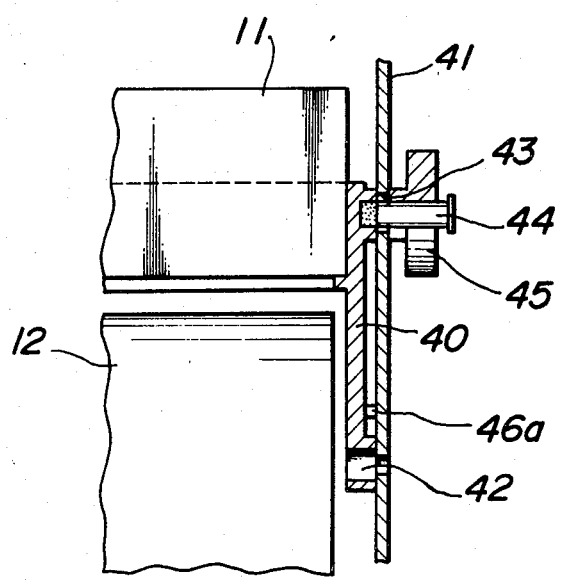
FIG. 3 is a cross section showing the moving mechanism of FIG. 2.

FIG. 2a is a schematic view showing an embodiment of the copying machine of document scanning and exposing type to be used in the duplicating system according to the invention. In FIG. 2a, an option device is not yet added to the copying apparatus. The copying apparatus shown in FIG. 2a is almost same as the copying apparatus illustrated in FIG. 1 except that a slit type exposing optical system 11 consisting of the array of converging optical fibers is not fixedly provided, but is swingable mounted. That is to say the optical system 11 is supported by a frame 40 which is journalled to a main body 41 about a shaft 42 as best shown in FIG. 3. In the main body 41 is formed an arcuate guide recess 43 extending in the swinging direction of the frame 40 and a screw 44 is secured to the frame 40 through the recess 42. To the screw 44 is fastened an operating handle 45. Thus by turning the handle 45 after the screw 44 has been moved to a suitable position, the frame 40 and thus the slit exposing optical system 11 may be fixedly positioned with respect to the main body 41. In FIG. 2a, the frame 40 is positioned in such a manner that it is made in contact with a stopper pin 46a secured to the main body 41. In this position an optical image of a document which is fed by the document feeder 3 is projected onto the photosensitive drum 12 by means of the slit exposing optical system 11 situating in an optical path P. It should be noted that the photosensitive drum 12 is shielded against light except for the slit exposing optical system 11 by means of hard wares 47a, 47b of the main body and shielding bellows 48a, 48b. One end of the bellows 48a is connected to the hard ware 47a and the other end is coupled with a base portion of the frame 40. One end of the bellows 48b is connected to the hard ware 47b and the other end to a plate 49 which is made in contact with the frame 40 in the condition shown in FIG. 2a. The plate 49 extends in an axial direction of the drum 12 and is secured to the main body.

Figure 2B:
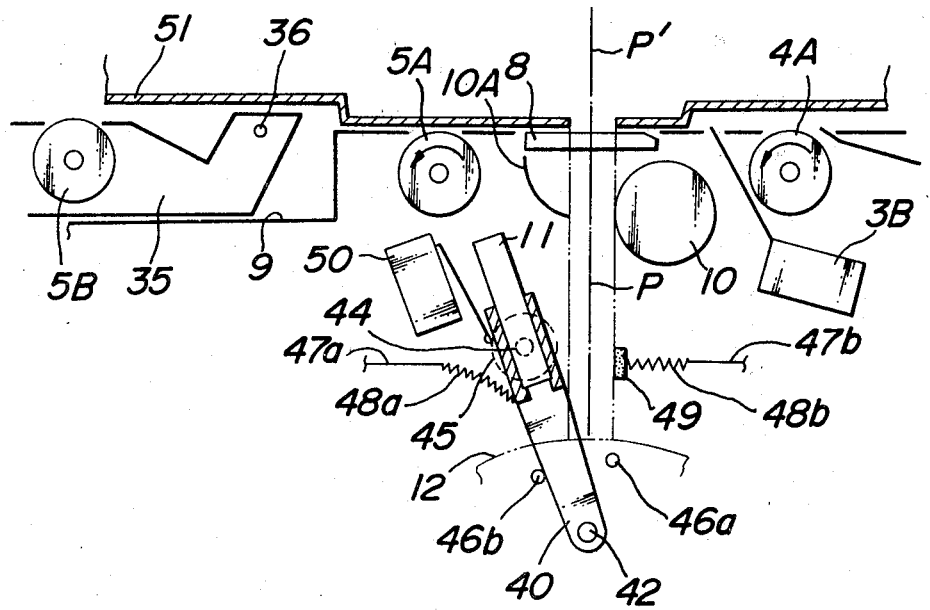

By loosening the handle 45, the optical system 11 can be manually turned in the anti-clockwise direction in FIG. 2a into a position shown in FIG. 2b. In the present embodiment this rotational movement of the optical system 11 in the anti-clockwise direction can be limited by a stopper pin 46b secured to the main body 41. In this position, the optical system 11 is withdrawn out of the optical path P. This position of the system 11 is detected by a microswitch 50. After the handle 45 and thus the slit exposing optical system 11 have been turned into the position shown in FIG. 2b, the frame 40 is secured to the main body 41 by tightening the handle 45.

In order to mount an option device 51 on the copying apparatus, the upper portion 35 of document feeder 3 is withdrawn to the left by rotating it about the shaft 36. Then the option device 51 is mounted on the copying apparatus in such a manner that an optical path P' of the option device 51 is made completely coincident with the optical path p of the copying apparatus. In this manner, an image projection start position on the photosensitive drum 12 can be made identical both for the copying operations with and without the option device 51. Therefore, a sequence control can be commonly used for both the operations.

It should be noted that it is advantageous to provide click mechanisms for positioning the slit exposing optical system 11 at the two operational positions shown in FIGS. 2a and 2b, respectively.

In the present embodiment, the option device 51 can be detachably mounted on the copying apparatus. In this case, when the option device is used, it is quite convenient for a user that the document to be copied can be inserted into the option device in the same direction as that into which the document is inserted into the copying apparatus, because otherwise the operator has to check front and rear and right and left of the document and of a copy to be duplicated and further document guide marks on the option device should be reversed with respect to those on the table of the copying apparatus. Further when the duplication is effected, while the document is moved with respect to the fixed slit exposing optical system 11, the rotational direction of the photosensitive drum 12 should be made identical with the document feed direction, because otherwise the image might be shifted on the drum surface. Therefore, in order to make the document feed direction in the option device identical with that in the copying apparatus, there should be provided in the option device an optional optical system for forming an erecting real image of the document to be duplicated by means of the option device. This optional optical system may be constituted in various forms.

Figure 4:
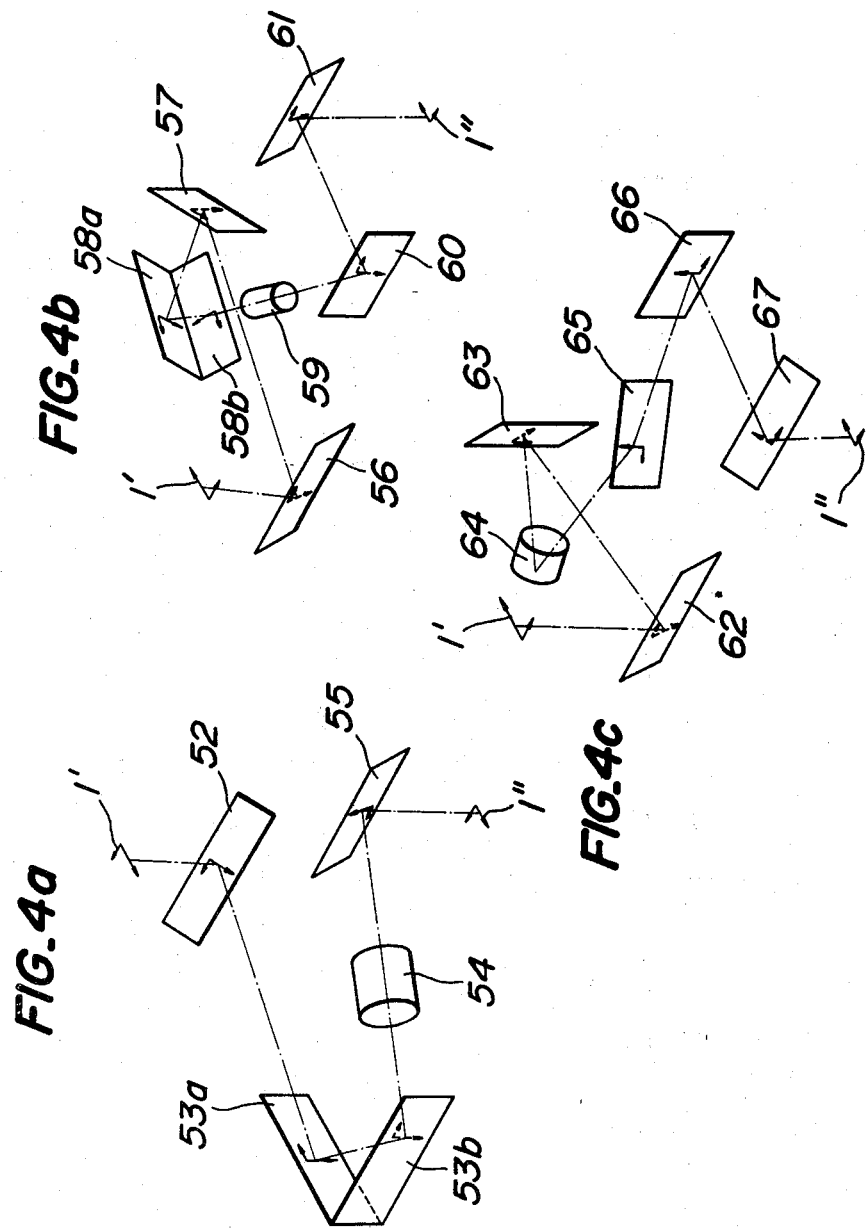
FIGS. 4a, 4b and 4c are perspective views showing there embodiments of an optional optical system installed in an option device according to the invention.

FIGS. 4a, 4b and 4c are perspective views showing three embodiments of the optional optical system for forming an erecting real image of the document. In the embodiment illustrated in FIG. 4a, a document image 1' is reflected by a mirror 52 and then reflected by Dach mirrors 53a and 53b so as to inverse the image right and left. The image is further inversed up and down as well as right and left by means of a lens 54. Finally the image is reflected by a mirror to form a reduced document image 1".

In the embodiment illustrated in FIG. 4b the document image 1' is first reflected by mirrors 56 and 57 and is further reflected by Dach mirrors 58a and 58b toward a lens 59. An image formed by the lens 59 is reflected by a mirror 61 to form a reduced document image 1".

In the embodiment shown in FIG. 4c, the document image 1' is introduced through mirrors 62 and 63 to an in-mirror lens 64 and an image formed by the lens 64 is projected by means of mirrors 65, 66 and 67 as a reduced erecting real image 1".

By constructing the optional optical system in the option device as shown in FIGS. 4a to 4c, the reduced document image 1" is shifted with respect to the original document image 1' in a direction perpendicular to the feeding direction of document. Therefore, the document of the option device may be shifted with respect to the document table of the copying apparatus, so that substantial area of the document table of the copying apparatus can be free from the option device and the operator can easily handle the document on the table of the copying apparatus.

Figure 5:
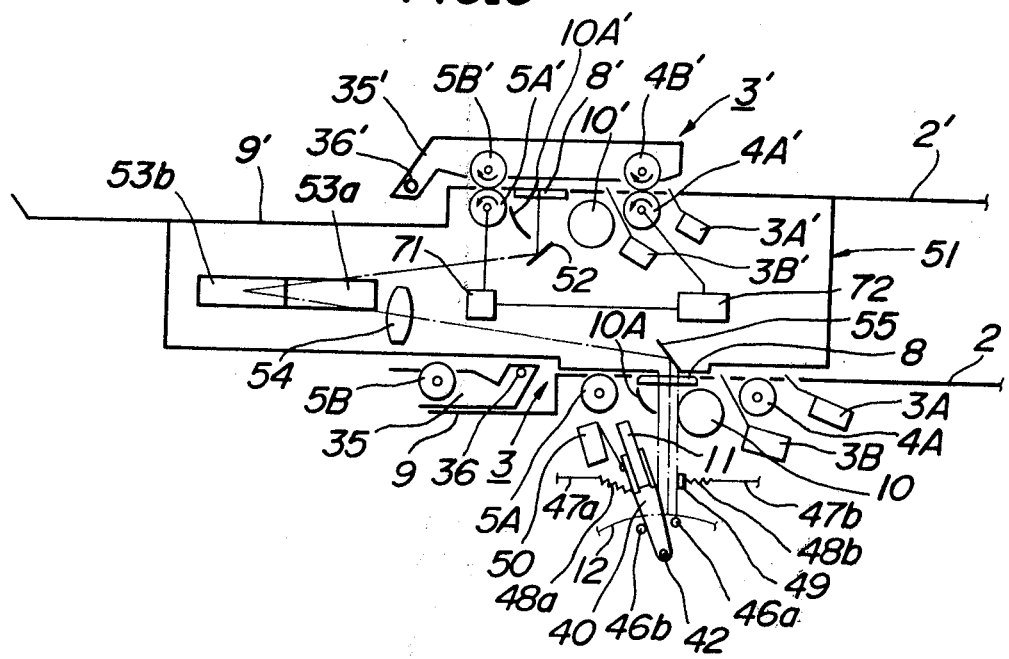
FIG. 5 is a schematic view illustrating an embodiment of the option device according to the invention.

FIG. 5 shows an embodiment of the option device 51 which is mounted on the copying apparatus shown in FIG. 2. The option device of the present embodiment comprises the optional optical system illustrated in FIG. 4a. A document feed mechanism of the option device 51 is substantially same as that of the copying apparatus except for several points which will be explained later and thus, similar members as those of the copying apparatus are denoted by the same reference numerals with dash. The document feed mechanism of the option device 51 comprises a driving motor 71 which is connected to an upstream feed roller 4A' by means of a clutch 72 and at the same time is directly connected to a downstream feed roller 5A'. In FIG. 5 these connections are shown only schematically. The motor 71 and clutch 72 are controlled by signals derived from document detecting switches 3A' and 3B' in the same manner as that of the document feed device 3 of the copying apparatus. As explained above, the option device 51 is so placed on the copying apparatus that their optical paths P and P' are made coincident with each other and thus, the reduced image of the document formed by the optional optical system in the option device 51 can be projected onto the photosensitive drum 12 from an imaginary sequence control start position thereof. Therefore, the sequence control of the copying apparatus can be used for printing a copy of the document inserted into the option device.

Figure 6:
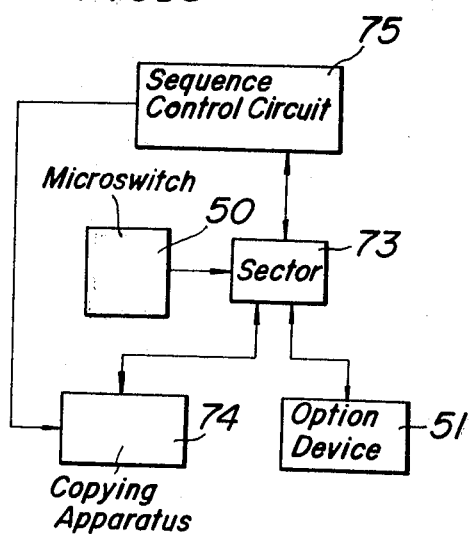
FIG. 6 is a block diagram showing an embodiment of a control circuit.

FIG. 6 is a block diagram showing an embodiment of a control circuit for controlling the operation of the copying apparatus and option device illustrated in FIG. 5. When the microswitch 50 is actuated, a sector 73 is driven into a state in which various control signals from a sequence control circuit 75 are selectively supplied to the option device 51. For instance, a signal for energizing the exposure lamp is supplied not to the lamp 10, but to the lamp 10' in the option device 51. On the contrary, when the microswitch 50 is made "off", the sector 73 is driven to supply the signals to the copying apparatus 74 and then the sequence control explained above with reference to FIG. 1 will be effected by a sequence control circuit 75 of the copying apparatus. Therefore, the document introduced into the option device 51 can be scanned in the same manner as in the copying apparatus 51. That is to say, when the slit exposing optical system 11 is turned in left as shown in FIG. 2b by operating the handle 45, the microswitch 50 is made "on" and the sector 73 is driven to supply the signals to the option device 51. Then the motor 71 is energized in response to a detection of a front edge of document inserted into the option device 51 by the switch 3A' and the document is fed along the document feed path. During this feeding, the document is scanned by the optional optical system in the option device 51 and the reduced image of document is projected onto the photosensitive drum 12 through the optical path P which has been formed by withdrawing the slit exposing optical system 11. In this case since the optical path P' of the option device 51 is made completely coincident with the optical path P of the copying apparatus 74, the imaginary sequence control start position on the drum 12 from which the formation of latent image corresponding to the reduced document image is effected, is made coincident with that in case of forming a latent image corresponding to an image of document inserted in the copying apparatus 74. Therefore it is not necessary to alter the sequence control of duplicating operation for the copying apparatus 74.

In the embodiment explained above, the slit exposing optical system 11 is withdrawn from the optical path P by turning it. It should be noted that the slit exposing optical system 11 may be pulled out of the copying apparatus in a direction perpendicular to a plane of the drawing of FIG. 2a and the microswitch 50 may be actuated in response to this pulling operation.

Figure 7A:
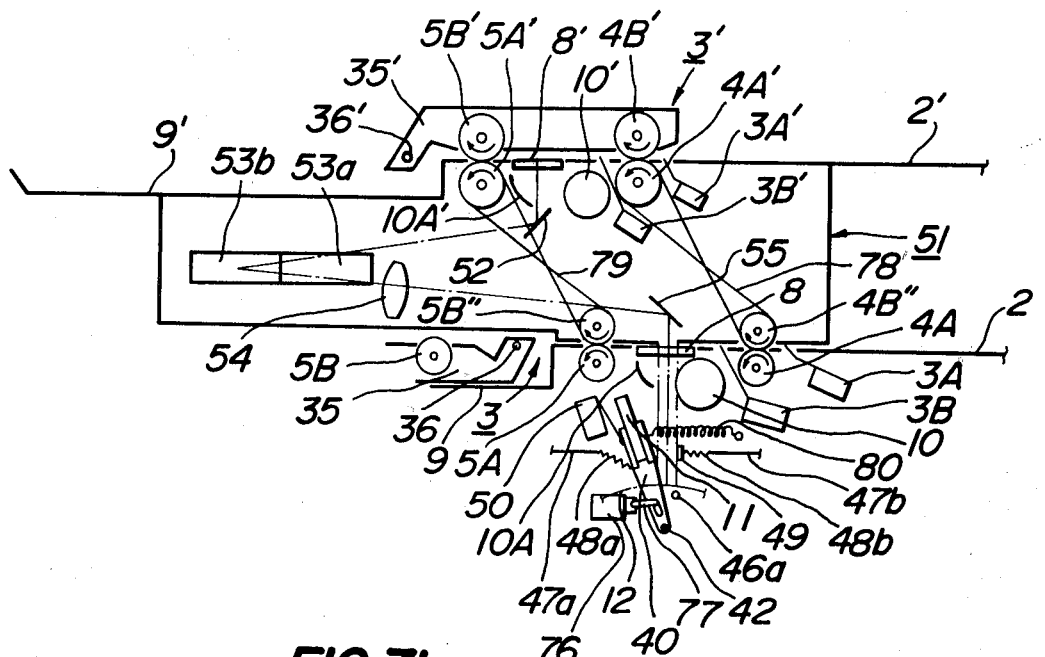
FIG. 7a is a schematic view illustrating another embodiment of the option device according to the invention and FIG. 7b is a block diagram showing a control circuit thereof.
Figure 7B:
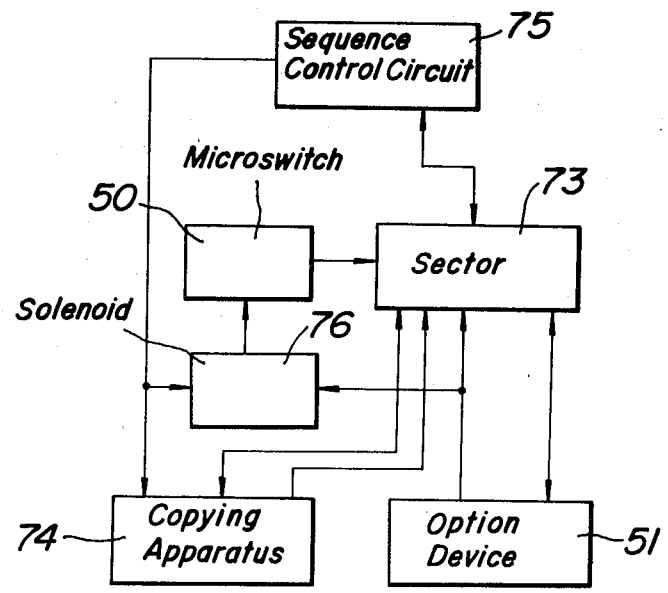

FIGS. 7a and 7b show another embodiment of the option device according to the invention. In this embodiment the frame 40 for holding the slit exposing optical system 11 is connected to a plunger 77 of a solenoid 76. The solenoid is energized by a document detection signal from the switch 3A' of the option device 51 so as to withdraw the optical system 11 from the optical path P of the copying apparatus. Further in this embodiment, the document feeder 3' of the option device 51 is driven by means of the driving mechanism of the copying apparatus. To this end, the option device 51 comprises a pair of rollers 4B" and 5B" which are made in contact with the rollers 4A and 5A, respectively of the copying apparatus, and these rollers 4B" and 5B" are coupled with the rollers 4A' and 5A' by means of timing belts 78 and 79, respectively. These belts are so arranged that the feeding direction in the option device 51 is made identical with that in the copying apparatus. In the present embodiment the slit exposing optical system 11 can be automatically moved with respect to the optical path P of the copying apparatus and the document feeder 3' of option device 51 can be driven by the motor and clutch provided in the copying apparatus. Therefore, it is not necessary to provide the motor 71 and clutch 72 shown in FIG. 5 in the option device. It should be noted that in the present embodiment the frame 40 holding the slit exposing optical system 11 is biased by a coiled spring 80 in the clockwise direction in FIG. 7a.

In the embodiment shown in FIGS. 7a and 7b, when the document is inserted into the option device 51, the switch 3A' is actuated by the front edge of document and the solenoid 76 is energized in response thereto. Then the optical system 11 is withdrawn out of the optical path P of the copying apparatus and the microswitch 50 is made on. When the microswitch 50 is actuated, the sector 73 is driven to selectively supply the signals from the sequence control circuit 75 to the option device 51. In this manner the document feeder 3 of the copying apparatus is driven and at the same time the document feeder 3' of the option device 51 is driven by means of the timing belts 78 and 79 in synchronism with the document feeder 3. In this manner the document inserted into the option device 51 is scanned and a reduced image of the document is formed by the optional optical system in the option device 51 into the photosensitive drum 12 from the imaginary projection-start position, from which position the image of the document inserted into the copying apparatus is also projected. When the document is inserted into the copying apparatus 74, while the option device 51 is mounted thereon, even if the switch 3A is actuated by the front edge of document, the solenoid 76 is not energized and thus, the microswitch 50 is remained "off". Under such a condition, the sector 73 may conduct the signals to and from the copying apparatus 74 and the document inserted into the copying apparatus 74 can be duplicated even if the option device 51 is placed on the copying apparatus.

When the option device 51 projects the image of document reduced by a magnitude of n, the feeding speed $V_R$ of the feeder 3' of the option device 51 should be made equal to a feed speed V of the feeder 3 of the copying apparatus divided by n. That is to say the following equation should be satisfied;

$$V_R = \frac{1}{n} V.$$

This condition can be easily satisfied by suitably selecting a diameter of the rollers 4A' and 5A' and/or 4B" and 5B". In the embodiment shown in FIG. 7a, the diameter of these rollers 4A', 4B', 5A', 5B' is made larger than that of the rollers 4B" and 5B". Further as explained above in connection with FIG. 1, after the document is detected by the switch 3A', it is fed to the switch 3B' and is stopped thereat for a moment and then the document is further fed. This timing of restart of the document at the position of switch 3B' is made identical with that at the switch 3B in the copying apparatus, because the sequence control circuit 75 is commonly used for the copying apparatus and the option device. Distances A and $A_R$ from the switch 3A and 3A' to the optical paths P and P', respectively should satisfy a condition of $$A_R = \frac{1}{n} A$$

and distances B and $B_R$ from rotational axes of the rollers 4A and 4A' to the optical paths P and P', respectively should satisfy a condition of $$B_R = \frac{1}{n} B.$$

By constructing in this manner, the reduction or enlargement duplicating operation with the option device 51 can be controlled by the sequence control circuit 75 of the copying apparatus without altering any one of various timing and the sequence can be initiated by either one of the document detection signals from the option device 51 and the copying apparatus 74.

Figure 8A:
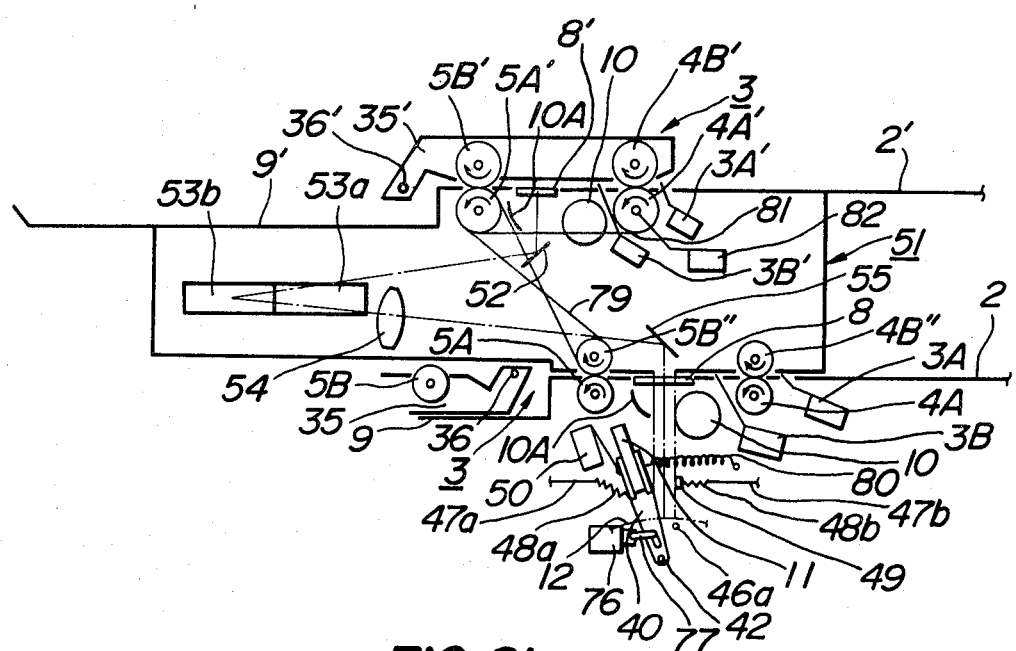
FIG. 8a is a schematic view showing another embodiment of the option device according to the invention and FIG. 8b is a block diagram illustrating a control circuit thereof.
Figure 8B:
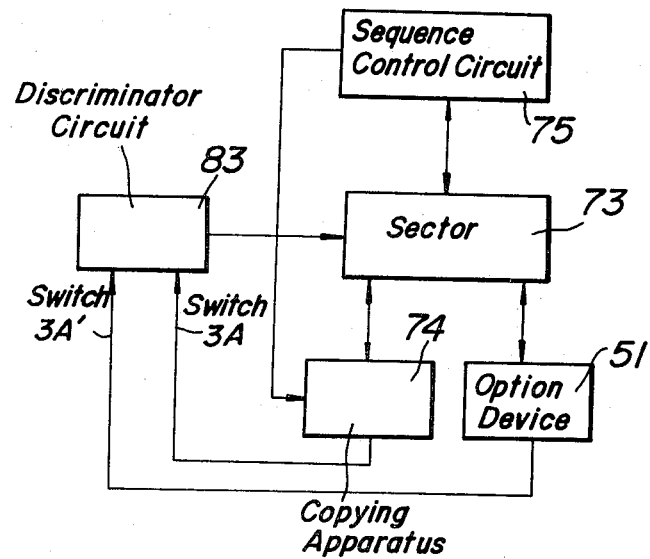

FIGS. 8a and 8b show another embodiment of the option device and its control circuit according to the invention. In this embodiment the downstream roller 5B" is coupled with the downstream roller 5A' by means of the timing belt 79, and the roller 5A' is connected to the upstream roller 4A' by means of a timing belt 81 and a clutch (not shown). The clutch is controlled by a clutch solenoid 82. Since the downstream roller 5A is always rotated during the duplicating operation, the document feeder 3' of the option device 51 can be driven by the roller 5A. Also in the present embodiment the duplicating operation with the option device 51 can be controlled by the sequence control circuit 75 of the copying apparatus without changing the timings of the various sequence control signals.

Now the operation of the device shown in FIG. 8a will be explained more in detail with reference to FIG. 8B. When the document is detected by the switch 3A' of the option device 51, it is recognized by a discriminating circuit 83 and the sector 73 is so controlled that the signals such as a clutch solenoid signal which will be supplied to the clutch solenoid for the roller 4A of the copying apparatus in case of the normal duplicating operation, is supplied to the clutch solenoid 82 of the option device 51. Then the roller 4A' is rotated to feed the document. After that the duplication with the option device 51 can be controlled by the sequence control circuit 75 of the copying apparatus as explained above with reference to FIGS. 7a and 7b. The present embodiment has advantages that either one of the duplicating operations with and without the option device can be predominantly carried out in response to a fact that to which feeder 3 or 3' the document is inserted first. For instance, when the documents are simultaneously inserted into the feeders 3 and 3', the both operations are inhibited.

FIG. 9 is a block diagram showing a still another embodiment of the control circuit according to the invention. In the previous embodiments, the document detection switches 3A, 3A' and the rollers 4A and 4A' of the copying apparatus 74 and option device 51 are so arranged that the distances A, $A_R$ and B, $B_R$ satisfy the relations $$A_R = \frac{1}{n} A \text{ and } B_R = \frac{1}{n} B.$$

However, as a case may be, these elements could not be arranged in such a manner. In this embodiment, the rollers 4A' and 5B' and switches 3A' and 3B' in the document feeder 3' of the option device 51 are arranged in the same geometric configuration as that of the document feeder 3 of the copying apparatus 74. In order to project the reduced image of document inserted into the option device onto the drum 12 from the same imaginary sequence control position even in such a configuration, there is arranged a timer circuit 84 between the sector 73 and the option device 51 so as to delay the control signals by a predetermined timer $\tau$.

Figure 10:
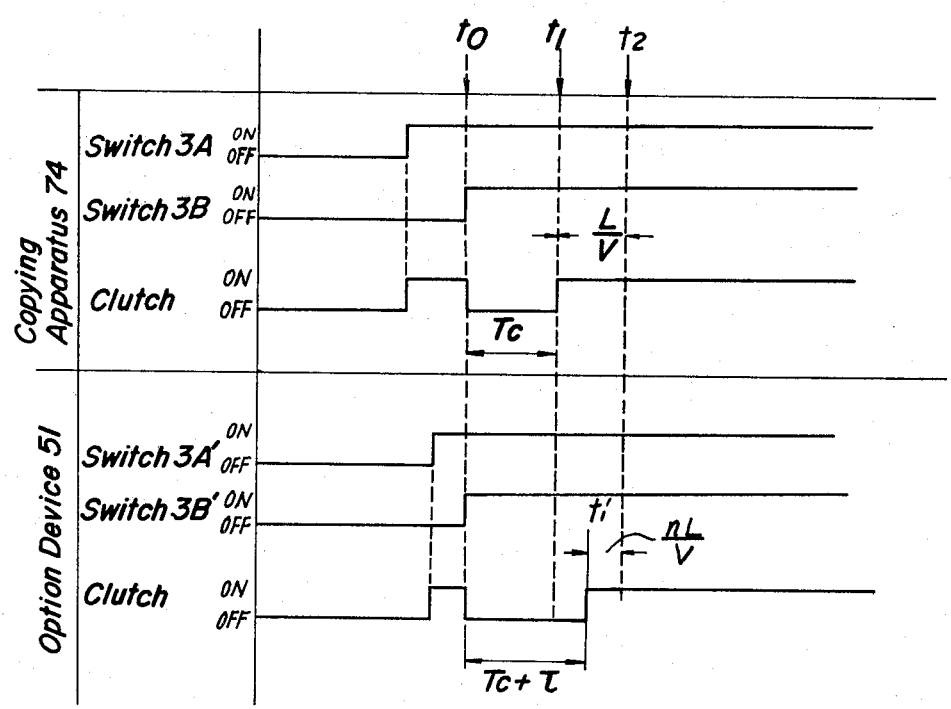
FIG. 10 shows waveforms for explaining the operation of the control circuit of FIG. 9.

As shown in a time chart of FIG. 10, the sequence control is initiated in response to the actuation of the downstream switch 3B or 3B'. That is to say, when the front edge of the document is detected by the switch 3B or 3B', the sqequence control circuit 75 is initiated at a start timing $t_0$. In the normal duplicating operation shown in an upper portion of FIG. 10, the circuit 75 produces a signal for actuating the clutch at a feed timing $t_1$ after a time period $T_C$ from the start point $t_0$. Then the document is fed again to the scanning position along a distance L at the speed V and the front edge of document arrives at the scanning position at a timing $t_2$ so as to start the projection. A time period from the timing $t_1$ to $t_2$ is equal to L/V. Contrary to this in case of the duplicating operation with the option device, the document feed start timing $t_1$ is delayed to a timing $t_1'$. A time period from this delayed timing $t_1'$ to the projection start timing $t_2$ is equal to (nL/V). Therefore, the delay time $\tau$ should be equal to $$\frac{L}{V} (1 - n).$$

Then the projection start timing $t_2$ can be made identical for both duplicating operations with and without the option device.

Figure 11:
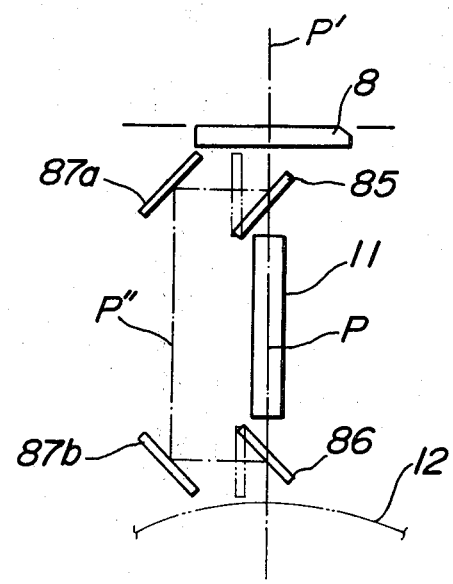
FIG. 11 is a schematic view showing another embodiment of the optical path changing mechanism.

FIG. 11 shows another embodiment of the device for withdrawing the slit exposing optical system 11 of the copying apparatus out of the optical path for projecting an image of document inserted into the option device. In this embodiment, the slit exposing optical system 11 is not movable, but is arranged fixedly. At entrace and exit sides of the optical system 11 are arranged mirrors 85 and 86 which are swingable in conjunction with each other. The device further includes fixed mirrors 87a and 87b. In case of effecting the duplication without the option device, the mirrors 85 and 86 are withdrawn out of the optical path P passing through the optical system 11 as shown by imaginary lines. When the document image is to be projected by means of the option device onto the photosensitive drum 12, the mirrors 85 and 86 are driven into the optical path as illustrated by solid lines. Then the image is projected onto the druam via the optical path P' in the option device and an optical path P" formed by the mirrors 85, 86, 87a and 87b in the copying apparatus. Also in this embodiment the image of the document inserted into the option device can be projected on the drum at the same expouse position as that in the normal duplicating operation without the option device. It should be further noted that an optical system for projecting a reduced image may be inserted between the mirrors 87a and 87b.

FIG. 12 is a perspective view of the copying apparatus shown in FIG. 1 with the upper feed mechanism 35 being turned away from the lower feed mechanism. When a thick document such as a book is to be duplicated, the book is placed on a thick document carriage 150 made of transparent material. The carriage comprises a movable holder 151 for holding the book in position. Along side edges of the carraige are integrally formed franges 150a and 150b and a rack 152 is secured to a lower surface of the frange 150a. In the document table 2 are formed, along its side edges, recesses 2a and 2b for accommodating the franges 150a and 150b, respectively. By sliding the carriage in the direction A the rack 152 is engaged with gears 153 and 154 successively and thus, the carriage 150 is fed at a given velocity by means of the gears 153 and 154 and the rack 152.

FIG. 13 is a front view illustrating the copying apparatus 160 shown in FIG. 12 and an option device 161 mounted on the copying machine 160. The option device 161 comprises a document table 162 and the optional optical system shown in FIG. 4a and including the mirrors 52, 53a, 53b and 55 and the projection lens system 54. The exit part of the optical path P' in the option device 161 is made coincident with the optical path P in the copying apparatus 160.

In the present embodiment, the document feeder 3' of the option device 162 is driven by the document feeder 3 of the copying apparatus 160 by means of the gear 154 as shown in FIGS. 14 and 15. That is to say, the option device 161 comprises a gear 163 which engages with the gear 154 of the document feeder 3 of the copying apparatus 160. The gear 163 is connected to a shaft 164 to which is also secured a gear 165. The gear 165 is then engaged with a gear 166 connected to a shaft 167 to which a roller 168 is also fixed. The roller 168 is coupled with a roller 169 by means of a timing belt 170 and the roller 169 is secured to a shaft 171 to which the document feed rollers 5A' are fixed. To the shaft 171 is also connected a roller 172 which is coupled with a roller 173 by means of a timing belt 174 and the roller 173 is connected to the feed rollers 4A' via a clutch 175. In this manner the feed rollers 5A' of the option device 161 are rotated in a given direction as long as the document feed rollers 5A of the copying apparatus 160 are rotated. The feed rollers 4A' of the option device 161 are rotated only when the clutch 175 is energized. By suitably choosing diameters of the gears 165 and 166 and rollers 168, 169, 172 and 173, the document feed speed in the option device 161 may be made equal to or different from the document feed speed in the copying apparatus 160. In the present embodiment since the option device 161 is used to project a reduced image of the document onto the photosensitive drum 12, the feed speed in the option device 161 is made higher than that in the copying apparatus 160. As clearly shown in FIG. 14, the option device 161 can be turned about a shaft 176 extending in the direction of the document feed and the copying apparatus 160 can be simply made free from the option device 161. Then the book carriage 150 can be used at will.

As shown in FIG. 14, when the optional optical system shown in FIG. 4a is used, the entrance part of the optical path P' in the option device 161 is shifted rightward with respect to the optical path P of the copying apparatus 160. Therefore, substantial area of the document table 2 of the copying apparatus is not covered by the option device 161, so that the operator can easily and correctly place the document on the document table 2 of the copying machine. Further an automatic document feeder may be arranged on the document table 2 without being hindered by the option device 161. Usually the various operating members such as a copy set dial, a stop button and a copy density adjusting lever and various indication lamps are provided on a front pannel of the copying apparatus. In this embodiment since the option device 161 is shifted backward, these operating members and indication lamps are not covered or hindred by the option device. Moreover a hight of the option device can be made small and thus, the document table 162 is situated at a relatively lower level, so that the operator can easily handle the option device. Further the optional optical system installed in the option device 161 can be made simple.

The present invention is not limited to the embodiments explained above, but may be modified in various ways within the scope of the invention. For instance, in the above embodiment, the copying apparatus comprises the array of converging optical fibers. But it should be noted that any other type of optical system may be used. Further the selection between the copying apparatus and option device may be automatically effected by a switch which is actuated when the option device is mounted on the copying apparatus.

As explained above in detail, in the duplicating system accoding to the invention the function of the copying apparatus can be materially increased by simply mounting the small option device and the duplicating operation with the option device can be equally controlled by the sequence control circuit provided in the copying apparatus. Moreover, the existing copying apparatus can be used in the duplicating system according to the invention with the minimum charge in construction. Further the function of the copying apparatus is not lost or deteriorated at all by the provision of the option device and thus, the copying apparatus can be used as it is even if the option device is added thereto.

What is claimed is:

1. A duplicating system comprising an electrophotographic copying apparatus which includes first optical scanning means for making a slit exposure, first means for feeding a first document to be copied at a first speed with respect to said first optical scanning means, photosensitive means for forming an electrostatic latent image corresponding to the image of document, and means for forming a duplicated copy with the aid of said latent image; and an option device which includes means for detachably mounting the option device onto the copying apparatus, second optical scanning means for making a slit exposure, second means for feeding a second document to be copied at a second speed with respect to said second optical scanning means and optional optical means for projecting the image of second document onto said photosensitive means of the copying apparatus; wherein said first feeding means in the copying apparatus and second feeding means in the option device are so constructed that the first and second documents are fed in the same direction.

2. A system according to claim 1, wherein said optional optical means includes means for projecting the image of second document onto the photosensitive member through the same optical path as that through which the image of first document is projectecd onto the photosensitive means.

3. A system according to claim 2, wherein said first scanning optical means in the copying apparatus comprises an array of converging optical fibers and means for withdrawing the array of converging optical fibers out of said optical path in the copying apparatus, when the image of second document is projected onto the photosensitive means.

4. A system according to claim 3, wherein said means for withdrawing the array is automatically actuated in response to an insertion of the second document into the option device.

5. A system according to claim 1, wherein said optional optical means includes means for projecting the image of the second document with a projection magnitude of n, and said first and second feeding means are so constructed that the first speed is made n times that of the second speed.

6. A system according to claim 5, wherein the copying apparatus comprises first means for detecting an insertion of the first document, the option device comprises second means for detecting an insertion of the second document, and a time period necessary for the second document travelling from said second detecting means to said second optical scanning means is made n times that of the time period necessary for the first document travelling from said first detecting means to said first optical scanning means.

7. A system according to claim 1, wherein said second feeding means in the option device comprises a driving motor and a plurality of feed rollers driven by said motor to feed the second document in the same document fed direction as that of said copying apparatus.

8. A system according to claim 1, wherein said second feeding means in the option device comprises a plurality of feed rollers for feeding the second document, and means for transferring a driving force of the first feeding means in the copying apparatus to said feed rollers to feed the second document in the same document feed direction as that of said copying apparatus.

9. A system according to claim 8, wherein said driving force transferring means in the option device comprises at least one coupling roller which contacts with at least one feed roller provided in the first feeding means for feeding the first document in the copying apparatus, and coupling means for transferring a rotational movement of the coupling roller to said feeding rollers of the second feeding means.

10. A system according to claim 8, wherein said driving force transferring means comprises a first gear which is engaged with a second gear provided in said first feeding means for feeding a thick document carriage in the copying apparatus, and coupling means for transferring a rotational movement of the coupling gear to said feed rollers of the second feeding means.

11. A system according to claim 1, wherein said optional optical means provided in the option device comprises at least two reflection mirrors and a projection lens system for forming an erecting real image of the second document, and having entrance and exit optical axes which are shifted in a direction perpendicular to the document feed direction.

12. A system according to claim 5, wherein said copying apparatus further comprises sequence control means for controlling the copying apparatus in such a manner that said image is projected onto the photosensitive means from an imaginary control start position, and said second feeding means and second optical scanning means in the option device have a geometric configuration which is similar to that of the first feeding means and first optical scanning means in the copying apparatus so that the image of second document is projected on the photosensitive means from the same position as said imaginary control start position, and that the duplicating operation for the second document is commonly controlled by said sequence control means provided in the copying apparatus.

13. A system according to claim 12, wherein the copying apparatus comprises first means for detecting an insertion of the first document into the copying apparatus, the option device comprises second means for detecting an insertion of the second document into the option device, and the system further comprises means for selecting either one of the copying apparatus and the option device in response to actuation of either one of the first and second detecting means, respectively, and for controlling the selected one of the copying apparatus and option device by means of the sequence control means.

14. A system according to claim 12, further comprising means for delaying a signal supplied from the sequence control means to one of the copying apparatus and the option device by a delay time depending upon a value of said n.

15. A system according to claim 8, wherein said optional optical means includes means for projecting the image of said second document with a projection magnitude of n, and said first and second feeding means are operative so that the first speed is made n times that of the second speed.

16. A system according to claim 15, wherein the copying apparatus comprises first means for detecting an insertion of the first document, the option device comprises second means for detecting an insertion of the second document, and a time period necessary for the second document travelling from said second detecting means to said second optical scanning means is made n times that of a time period necessary for the first document travelling from said first detecting means to said first optical scanning means.

17. A system according to claim 8, wherein said copying apparatus further comprises sequence control means for controlling the copying apparatus in such a manner that said image is projected onto the photosensitive means from an imaginary control start position, and said second feeding means and second optical scanning means in the option device have a geometric configuration which is similar to that of the first feeding means and first optical scanning means in the copying apparatus so that the image of the second document is projected on the photosensitive means from the same position as said imaginary control start position and that the duplicating operation for the second document is commonly controlled by said sequence control means provided in the copying apparatus.

18. A system according to claim 17, wherein the copying apparatus comprises first means for detecting an insertion of the first document into the copying apparatus, the option device comprises second means for detecting an insertion of the second document into the option device, and the system further comprises means for selecting either one of the copying apparatus and the option device in response to actuation of either one of the first and second detecting means respectively, and for controlling the selected one of the copying apparatus and the option device by means of the sequence control means.

19. A system according to claim 17, further comprising means for delaying a signal supplied from the sequence control means to one of the copying apparatus and the option device by a delay time depending upon a value of said n.

20. A duplicating system comprising an electrophotographic copying apparatus which includes first optical scanning means for making a slit exposure, first means for feeding a first document to be copied at a first speed with respect to said first optical scanning means, photosensitive means for forming an electrostatic latent image corresponding to the image of document, and means for forming a duplicated copy with the aid of said latent image; and an option device which includes means for detachably mounting the option device onto the copying apparatus, second optical scanning means for making a slit exposure, second means for feeding a second document to be copied at a second speed with respect to the said second optical scanning means and optional optical means for projecting the image of second document onto said photosensitive means of the copying apparatus; wherein said second feeding means in the option device comprises a plurality of feed rollers for feeding the second document and and means for transferring a driving force of the first feeding means in the copying apparatus to said feed rollers to feed the second document in the same document feed direction as that of said copying apparatus.

21. A system according to claim 20, wherein said first documentf feeding means comprises a lower feeding mechanism having feeding rollers and a driving source for rotating the feeding rollers, and an upper feeding mechanism having rollers which are rotated while being in contact with said feeding rollers of the lower feeding mechanism, the upper feeding mechanism being removably mounted on the lower feeding mechanism, and, when the option device is mounted on the copying apparatus after the upper feeding mechanism has been removed from the lower feeding mechanism, said second feeding means is driven by means of said driving source provided in the lower feeding mechanism.

22. A system according to claim 20, wherein said optional optical means includes means for projecting the image of the second document onto the photosensitive member through the same optical path as that through which the image of first document is projected onto the photosensitive means.

23. A system according to claim 22, wherein said first scanning optical system in the copying apparatus comprises an array of converging optical fibers and means for withdrawing the array of converging optical fibers out of said optical path in the copying apparatus, when the image of second document is projected onto the photosensitive means.

24. A system according to claim 23, wherein said means for withdrawing the array is automatically actuated in response to an insertion of the second document into the option device.

25. A system according to claim 20, wherein said second feeding means in the option device comprises a plurality of feed rollers for feeding the second document and means for transferring a driving force of the first feeding means in the copying apparatus to said feed rollers, and said driving force transferring means comprises at least one coupling roller which contacts at least one feed roller provided in the first feeding means for feeding the first document in the copying apparatus and coupling means for transferring a rotational movement of the coupling roller to said feeding rollers of the second feeding means.

26. A system according to claim 20, wherein said second feeding means in the option device comprises a plurality of feed rollers for feeding the second document and means for transferring a driving force of the first feeding means in the copying apparatus to said feed rollers, and said driving force transferring means comprises a first gear which is engaged with a second gear provided in said first feeding means for feeding a thick document carriage in the copying apparatus, and coupling means for transferring a rotational movement of the coupling gear to said feed rollers of the second feeding means.

27. A system according to claim 20, wherein said optional optical means comprises at least two reflection mirrors and a projection lens system for forming an erecting real image of the second document and having entrance and exit optical axes which are shifted in a direction perpendicular to the document feeding direction.

* * * * *